United States Patent
Jung et al.

(10) Patent No.: US 12,022,189 B2
(45) Date of Patent: Jun. 25, 2024

(54) ELECTRONIC DEVICE AND METHOD FOR GENERATING AN IMAGE

(71) Applicant: Samsung Electronics Co., Ltd., Gyeonggi-do (KR)

(72) Inventors: Yumin Jung, Gyeonggi-do (KR); Junghoon Kim, Gyeonggi-do (KR); Sungho Lee, Gyeonggi-do (KR); Seungwon Han, Gyeonggi-do (KR); Soyeon Heo, Gyeonggi-do (KR); Jiyoon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 18/071,203

(22) Filed: Nov. 29, 2022

(65) Prior Publication Data
US 2023/0091780 A1    Mar. 23, 2023

Related U.S. Application Data

(63) Continuation of application No. PCT/KR2021/010288, filed on Aug. 4, 2021.

(30) Foreign Application Priority Data

Aug. 4, 2020 (KR) .......................... 10-2020-0097201

(51) Int. Cl.
*H04N 23/667* (2023.01)
*G06T 5/70* (2024.01)
(Continued)

(52) U.S. Cl.
CPC ............. *H04N 23/667* (2023.01); *G06T 5/70* (2024.01); *G06T 7/194* (2017.01); *H04N 5/2226* (2013.01);
(Continued)

(58) Field of Classification Search
None
See application file for complete search history.

(56) References Cited

U.S. PATENT DOCUMENTS 8,189,100 B2    5/2012    Li et al.
8,723,912 B2    5/2014    Michrowski et al.
(Continued)

FOREIGN PATENT DOCUMENTS

JP    2009-545256    12/2009
JP    2012-142729    7/2012
(Continued)

OTHER PUBLICATIONS

WO2021/162353 (Year: 2021).*
(Continued)

*Primary Examiner* — Paul M Berardesca
(74) *Attorney, Agent, or Firm* — The Farrell Law Firm, P.C.

(57) ABSTRACT

An operation method of an electronic device is provided. The method includes generating a first bokeh image by blurring a part of an image acquired using at least one of a first camera module or a second camera module, by using a distance value determined based on the first camera module and the second camera module, and identifying whether a designated subject is included in the acquired image by using at least one of the first camera module or the second camera module; and in response to identifying that the designated subject is included, deactivating the second camera module, performing image segmentation on the acquired image by using the first camera module, and generating a second bokeh image by blurring a part of the acquired image, based on a result of the image segmentation.

20 Claims, 9 Drawing Sheets

(51) Int. Cl.
  *G06T 7/194*    (2017.01)
  *H04N 5/222*   (2006.01)
  *H04N 5/262*   (2006.01)
  *H04N 13/00*   (2018.01)
  *H04N 23/61*   (2023.01)
  *H04N 23/617*  (2023.01)

(52) U.S. Cl.
  CPC .......... *H04N 5/2621* (2013.01); *H04N 13/00* (2013.01); *H04N 23/61* (2023.01); *H04N 23/617* (2023.01); *H04N 2013/0081* (2013.01)

(56) References Cited

U.S. PATENT DOCUMENTS

| | | |
|---|---|---|
| 9,716,825 B1 | 7/2017 | Manzari et al. |
| 10,237,473 B2 | 3/2019 | Molgaard et al. |
| 10,482,583 B1 | 11/2019 | Suszek |
| 10,897,558 B1* | 1/2021 | Sun ........................... G06T 5/20 |
| 11,113,532 B2 | 9/2021 | Kim et al. |
| 11,165,949 B2 | 11/2021 | Manzari et al. |
| 11,184,553 B1* | 11/2021 | Liu ........................ H04N 23/84 |
| 2018/0249090 A1* | 8/2018 | Nakagawa ........... H04N 5/2621 |
| 2019/0080457 A1 | 3/2019 | Shukla et al. |
| 2019/0132495 A1 | 5/2019 | Ouyang et al. |
| 2020/0051218 A1 | 2/2020 | Hyun et al. |
| 2021/0073945 A1 | 3/2021 | Kim et al. |
| 2021/0073953 A1 | 3/2021 | Lee |

FOREIGN PATENT DOCUMENTS

| | | |
|---|---|---|
| KR | 10-2017-0082228 | 7/2017 |
| KR | 10-2018-0108847 | 10/2018 |
| KR | 10-2019-0094133 | 8/2019 |
| KR | 10-2019-0108208 | 9/2019 |
| KR | 10-2019-0110965 | 10/2019 |
| KR | 10-2019-0124600 | 11/2019 |
| KR | 10-2020-0020646 | 2/2020 |
| WO | WO-2021162353 A1 * | 8/2021 |

OTHER PUBLICATIONS

PCT/ISA/210 Search Report issued on PCT/KR2021/010288, dated Nov. 25, 2021, pp. 5.
PCT/ISA/237 Written Opinion issued on PCT/KR2021/010288, dated Nov. 25, 2021, pp. 4.

* cited by examiner

ELECTRONIC DEVICE AND METHOD FOR GENERATING AN IMAGE

CROSS-REFERENCE TO RELATED APPLICATION(S)

This application is a bypass continuation application of International Application No. PCT/KR2021/010288, filed on Aug. 4, 2021, and is based on and claims priority under 35 U.S.C. § 119 to Korean Patent Application No. 10-2020-0097201, filed on Aug. 4, 2020, in the Korean Intellectual Property Office, the entire disclosure of which is incorporated herein by reference.

BACKGROUND

1. Field

Various embodiments relate to an electronic device that generates an image by adaptively switching a mode according to a subject.

2. Description of the Related Art

Image acquisition using a camera of an electronic device corresponds to a technical field familiar to users. Users desire to obtain more diverse images, rather than simply acquiring images, by applying special effects to the acquired images.

Among various special effects, a bokeh effect, which is a photographing method allowing a subject to stand out more by keeping a subject area in focus and blurring the background, may be physically realized by adjusting a focal length and the amount of light coming to a sensor in a digital single-lens reflex (DSLR) camera, and efforts are continuing to obtain an image, in which a person/object stands out more, by applying the bokeh effect to a camera of a portable electronic device.

As a related technology, the bokeh effect is applied by separating a person/background from an acquired image via artificial intelligence (AI)-based image processing using a single camera or estimating distance values by using multiple cameras.

A technique using multiple cameras may incur a failure in image matching due to noise generation in an image caused by camera shake or movement of a subject. In the case of multiple cameras mounted on a mobile electronic device, respective lenses have different optical characteristics (e.g., aperture, focal length, and the presence or absence of OIS), and thus acquisition of an accurate distance value may be difficult.

According to the prior art. AI-based image processing may be applied only to a subject that has been defined and learned in advance, and high current consumption may be involved.

SUMMARY

Aspects of the disclosure are to address at least the above-mentioned problems and/or disadvantages, and to provide at least the advantages described below.

According to an aspect, an optimal bokeh effect can be applied to an acquired image by adaptively switching between a stereo mode and an AI mode of an electronic device according to a subject.

According to an aspect, current consumption and heat generation can be minimized by controlling activation and deactivation of a camera during mode switching and adaptive mode switching.

An electronic device according to an embodiment includes a first camera module and a second camera module; a memory; and a processor operatively connected to the first camera module, the second camera module, and the memory, wherein the processor generates a first bokeh image by blurring a part of an image acquired using at least one of the first camera module or the second camera module, by using distance values determined based on the first camera module and the second camera module, and identifies whether a designated subject is included in the acquired image by using at least one of the first camera module or the second camera module; and in response to identifying that the designated subject is included, the processor deactivates the second camera module, performs image segmentation on the acquired image by using the first camera module, and generates a second bokeh image by blurring a part of the acquired image, based on a result of the image segmentation.

A method of an electronic device according to an embodiment includes generating a first bokeh image by blurring a part of an image acquired using at least one of a first camera module or a second camera module, by using distance values determined based on the first camera module and the second camera module, and identifying whether a designated subject included in the acquired image by using at least one of the first camera module or the second camera module, and in response to identifying that the designated subject is included, deactivating the second camera module, performing image segmentation on the acquired image by using the first camera module, and generating a second bokeh image by blurring a part of the acquired image, based on a result of the image segmentation.

An electronic device according to an embodiment includes a camera module and a distance detection sensor; a memory; and a processor operatively connected to the camera module, the distance detection sensor, and the memory, wherein the processor generates a first bokeh image by blurring a part of an image acquired using the camera module, by using distance values determined based on the distance detection sensor, and identifies whether a designated subject is included in the acquired image by using the camera module; and in response to identifying that the designated subject is included, the processor deactivates the distance detection sensor, performs image segmentation on the acquired image by using the camera module, and generates a second bokeh image by blurring a part of the acquired image, based on a result of the image segmentation.

BRIEF DESCRIPTION OF THE DRAWINGS

The above and other aspects, features, and advantages of the disclosure will be more apparent from the following description of embodiments of the disclosure with reference to the accompanying drawings, in which.

DETAILED DESCRIPTION

Figure 1:
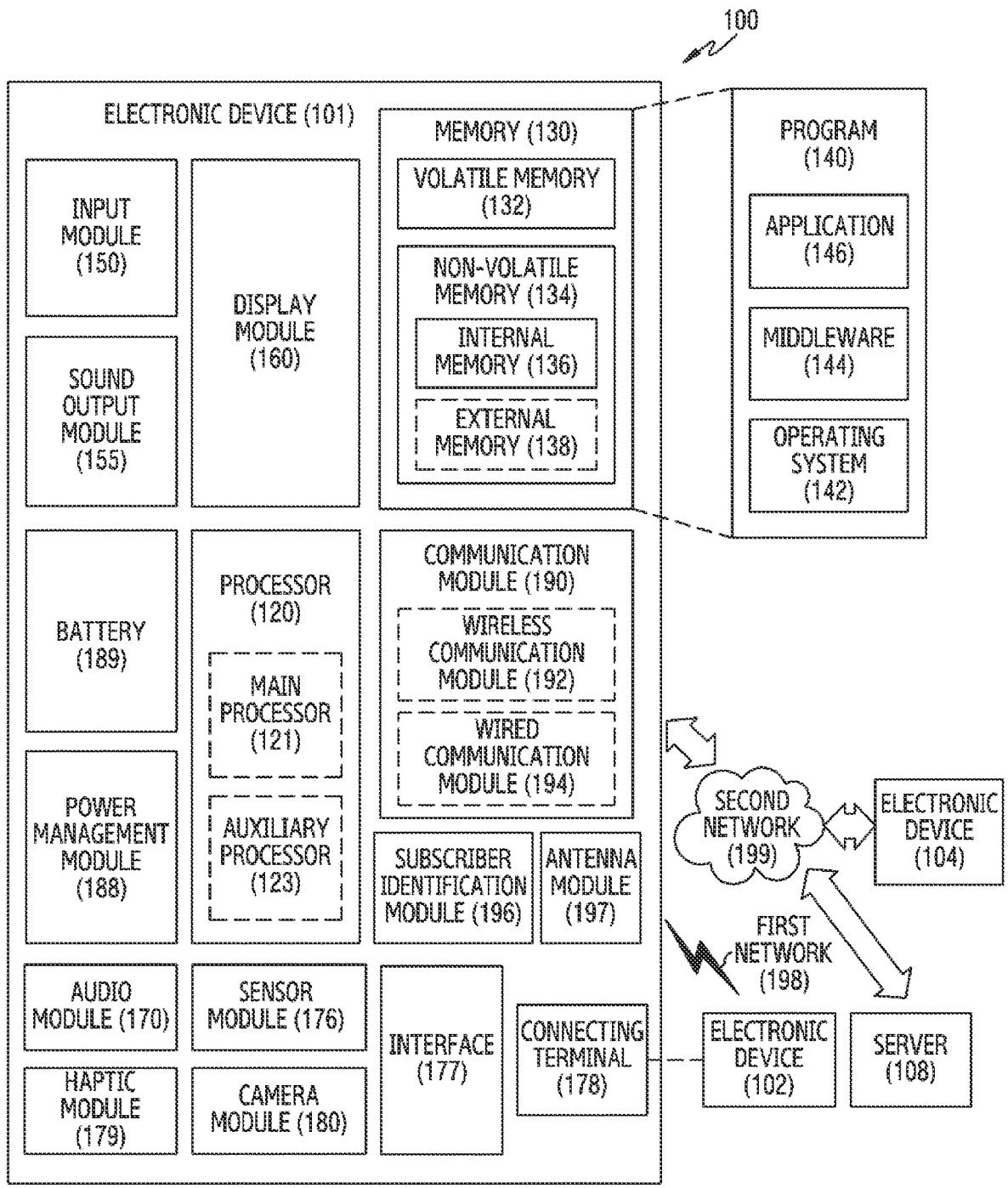
FIG. 1 is a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. The auxiliary processor 123 (e.g., the NPU) may include a hardware structure specified for AI model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof, but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors. ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., mmWave band) to achieve, e.g., a high data transmission rate. The wireless communication module 192 may support various technologies for securing performance on a high-frequency band, such as, e.g., beamforming, massive multiple-input and multiple-output (mMIMO), full dimensional MIMO (FD-MIMO), array antenna, analog beamforming, or large scale antenna. The wireless communication module 192 may support various requirements specified in the electronic device 101, an external electronic device 102 or 104, or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

The antenna module 197 may form a mmWave antenna module. The mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 102 or 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing the function to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. The external electronic device 102 or 104 may include an Internet-of-things (IoT) device. The server 108 may be an intelligent server using machine learning and/or a neural network. The external electronic device 102 or 104 or the server 108 may be included in the second network 199. The electronic device 101 may be applied to intelligent services (e.g., smart home, smart city, smart car, or healthcare) based on 5G communication technology or IoT-related technology.

Figure 2:
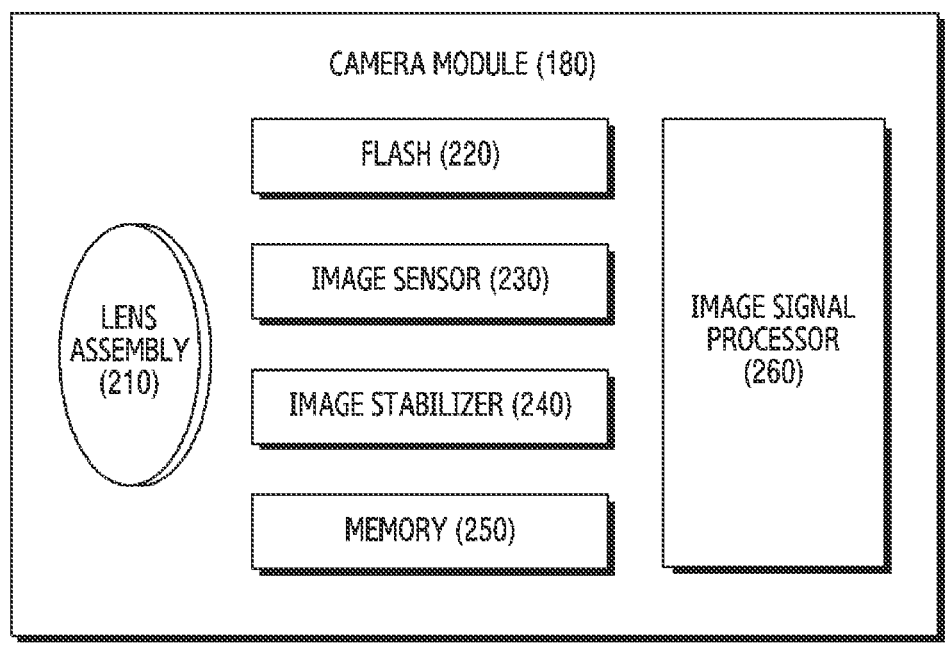
FIG. 2 is a block diagram illustrating a camera module according to an embodiment.

FIG. 2 is a block diagram 200 illustrating the camera module 180 according to an embodiment.

Referring to FIG. 2, the camera module 180 may include a lens assembly 210, a flash 220, an image sensor 230, an image stabilizer 240, memory 250 (e.g., buffer memory), and/or an image signal processor (ISP) 260. The lens assembly 210 may collect light emitted or reflected from an object whose image is to be taken. The lens assembly 210 may include one or more lenses. The camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as an RGB sensor, a black-and-white (BW) sensor, an IR sensor, or a UV sensor; a plurality of image sensors having the same attribute; or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor or an acceleration sensor disposed inside or outside the camera module 180. The image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the ISP 260. The memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one of the components (e.g., the image sensor 230) included in the camera module 180. An image processed by the ISP 260 may be stored back in the memory 250 for further processing, or may be provided to an external component (e.g., the memory 130, the display module 160, the electronic device 102, the electronic device 104, or the server 108) outside the camera module 180. The ISP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
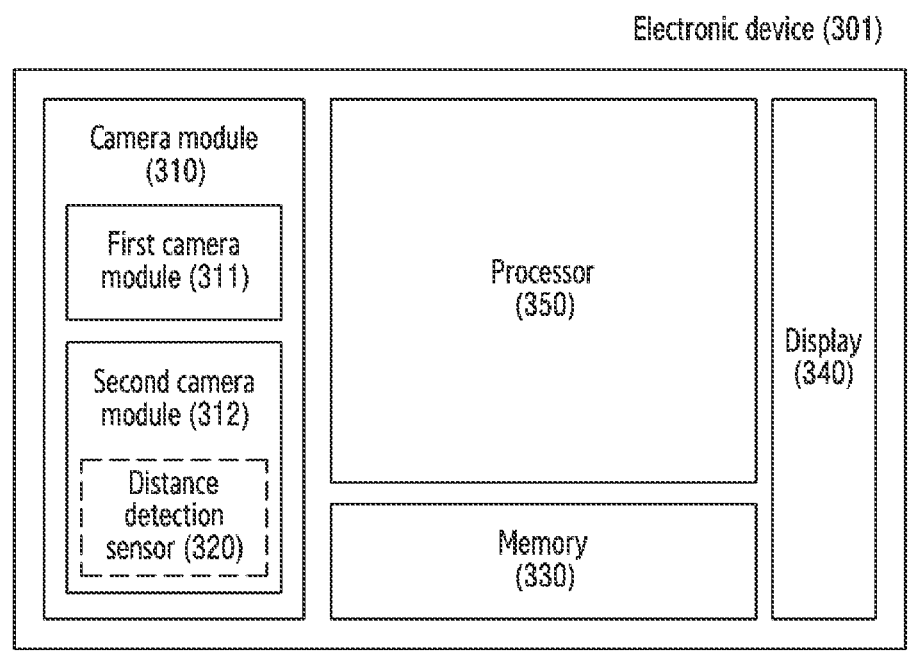
FIG. 3 is a diagram illustrating a simplified configuration of an electronic device according to an embodiment.

FIG. 3 illustrates a simplified configuration of an electronic device according to an embodiment.

The electronic device 301 may at least include a camera module 310, a memory 330, a display 340, and a processor 350. The electronic device 301 may further include a distance detection sensor 320.

The camera module 310 may include a first camera module 311 and a second camera module 312, wherein each of the first camera module 311 and the second camera module 312 corresponds to the camera module 180 of FIG. 2. The second camera module 312 may include the distance detection sensor 320 (e.g., time-of-flight (ToF) sensor and depth sensor).

The camera module 310 (and/or first camera module 311 and second camera module 312) may acquire images (e.g., subject image and background image) of an external environment of the electronic device 301, and may acquire distance values for subjects included in the images of the external environment.

With respect to the images of the external environment of the electronic device 301, the distance detection sensor 320 may acquire distance values for subjects included in the environment. The distance detection sensor 320 (e.g., ToF sensor and depth sensor) may be included in the second camera module 312, and the distance detection sensor 320 may replace the second camera module 312 in some cases.

The memory 330 may store data on images which are acquired based on the camera module 310 (and/or first camera module 311 and second camera module 312) by the electronic device 301. For example, the data on the images acquired by the camera module 310 (or first camera module 311 and second camera module 312) may include at least RGB data, distance data, and segmentation data. The memory 330 may store data on distance values acquired by the distance detection sensor 320.

The display 340 may display, on a screen, data on the images acquired by the electronic device 301 so as to allow a user to see the data. For example, the electronic device 301 may acquire the image of the external environment on the basis of the camera module 310, and may display data relating to the acquired image on the display 340.

The processor 350 may control the aforementioned camera module 310, the distance detection sensor 320, the memory 330, and the display 340. For example, the processor 350 may control the aforementioned operations (e.g., acquiring an image by the camera module 310, acquiring distance values by the distance detection sensor 320, performing storage by the memory 330, and performing display by the display 340) of the elements.

The processor 350 may include at least a main processor (e.g., a CPU or AP) or an auxiliary processor (e.g., graphic processing device, NPU, ISP, sensor hub processor, or CP) which is operable independently of or together with the main processor.

The electronic device 301 may further include elements included in the electronic device 101 of FIG. 1, in addition to the camera module 310, the distance detection sensor 320, the memory 330, the display 340, and the processor 350. The aforementioned operations of the camera module 310, the distance detection sensor 320, the memory 330, the display 340, and the processor 350 may not be limited to the above descriptions.

Descriptions for operations of FIG. 4 to FIG. 9 according to various embodiments will be described later with reference to FIG. 3.

Figure 4:
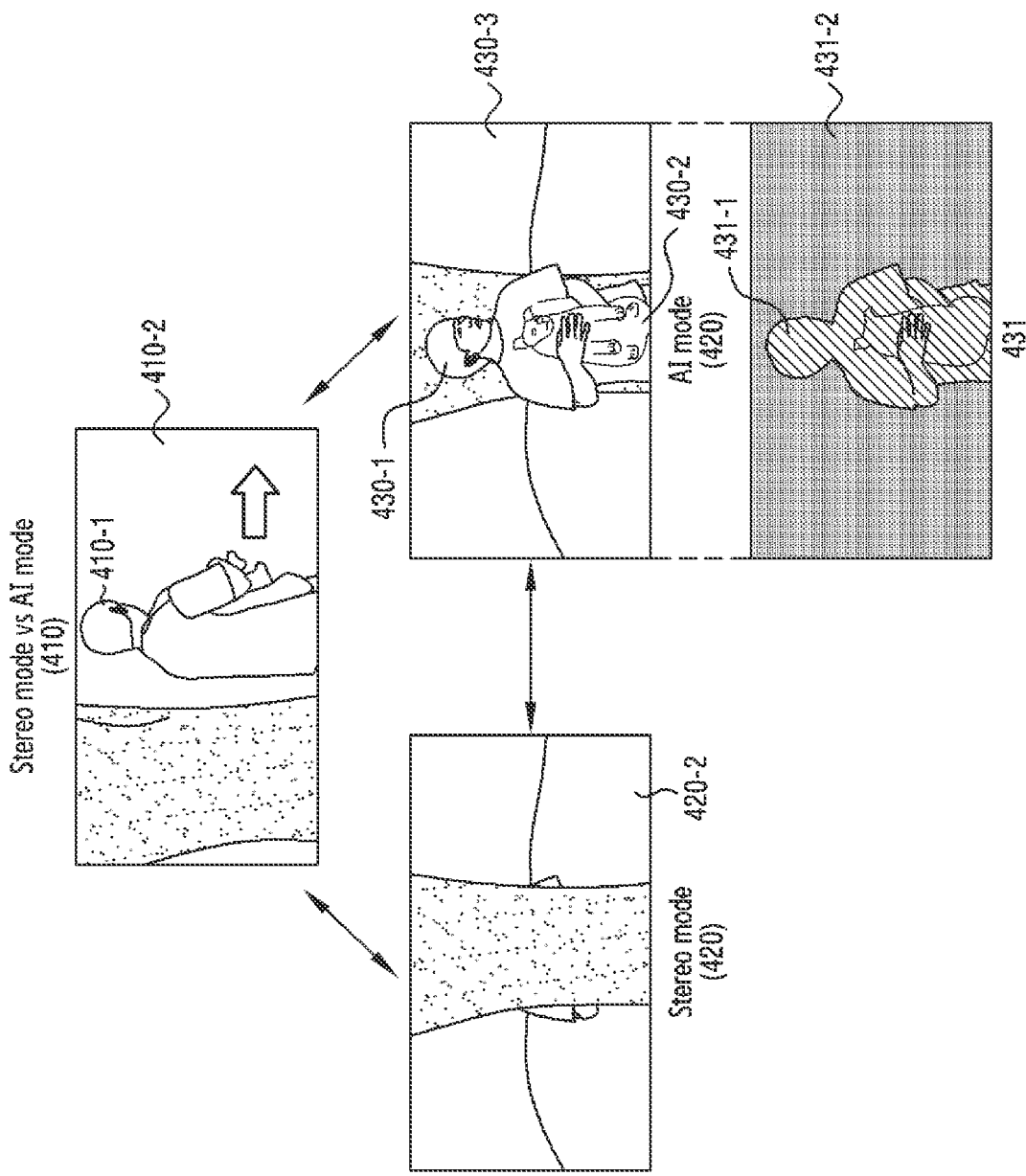
FIG. 4 is a diagram illustrating a concept of switching a mode according to a subject by the electronic device, according to an embodiment.

FIG. 4 illustrates a concept of switching a mode according to a subject by the electronic device, according to an embodiment.

For capturing an image under the control of the processor 350, the electronic device 301 may have a stereo mode and an AI mode.

The electronic device 301 may have the stereo mode in which an image is captured using the first camera module 311 and the second camera module 312 (and/or distance detection sensor 320) under the control of the processor 350. For example, under the control of the processor 350, the electronic device 301 may acquire an image of the external environment of the electronic device 301 by using the first camera module 311 and the second camera module 312, and may acquire distance values for subjects included in the environment. As another example, when the stereo mode is operated, the processor 350 of the electronic device 301 may control the first camera module 311 and the second camera module 312 so as to synchronize camera settings (e.g., optical image stabilizer (OIS), auto-focusing (AF), auto-exposure (AE), and auto white balance (AWB)). In this case, the processor 350 may operate based on a CPU.

In the electronic device 301, there may be the AI mode in which an image is captured using only the first camera module 311 (or second camera module 312) under the control of the processor 350. For example, under the control of the processor 350, the electronic device 301 may acquire an image by using at least one camera module (e.g., first camera module 311 or second camera module 312) and may perform image segmentation on the acquired image. As another example, when the electronic device 301 operates in the AI mode, the processor 350 may operate based on an NPU and/or learning data (e.g., pre-learned data relating to image segmentation).

The electronic device 301 may determine whether to perform photographing in the stereo mode or in the AI mode under the control of the processor 350. The determination may be made by the electronic device 301 under the control of the processor 350, based on identification of whether a subject (subject 410-1, subject 430-1, and subject 430-2) is a designated subject. Types of subjects, for which the AI mode of the electronic device 301 supports image segmentation, may be all types of subjects, such as people, animals, cars, and food.

Referring to 410, under the control of the processor 350, the electronic device 301 may periodically determine whether to perform photographing based on the stereo mode or perform photographing in the AI mode according to the subject 410-1. For example, if the subject 410-1 exists in the acquired image and the subject 410-1 is one of designated subjects, the electronic device 301 may perform photographing in the AI mode under the control of the processor 350. If the subject 410-1 does not exist in the acquired image, the electronic device 301 may perform photographing in the stereo mode under the control of the processor 350. The subject 410-1 may be one of subjects designated in relation to image segmentation in the electronic device 301.

Under the control of the processor 350, the electronic device 301 may minimize current consumption and heat generation by dynamically controlling, during mode switching, whether to activate a part (e.g., first camera module 311 or second camera module 312) of multiple camera modules, or by controlling camera settings (e.g., optical image stabilizer (OIS), auto-focusing (AF), auto-exposure (AE), and auto w % bite balance (AWB)) for synchronization between the multiple camera modules.

The electronic device 301 may acquire an image, based on the first camera module 311 and the second camera module 312 (e.g., based on the stereo mode) under the control of the processor 350.

The electronic device 301 may fundamentally acquire (or capture) an image, based on the stereo mode. For example, the electronic device 301 may periodically determine, under the control of the processor 350, whether to perform photographing in the AI mode while acquiring an image on the basis of the stereo mode.

Referring to 420, even when a subject included in the external environment is obscured by another object or has deviated from the angle of view of the camera module 310 so that the subject cannot be identified, the electronic device 301 may acquire an image on the basis of the stereo mode under the control of the processor 350.

Referring to 420, under the control of the processor 350, the electronic device 301 may acquire an image 420-2 of the external environment by using the first camera module 311 and the second camera module 312, and may acquire distance values for subjects included in the external environment.

The electronic device 301 may periodically identify, under the control of the processor 350, whether the subject (e.g., subject 410-1, subject 430-1, or subject 430-2) is included in the acquired image.

Referring to 410, under the control of the processor 350, the electronic device 301 may identify that the subject 410-1 is included in the external environment. In this case, referring to 430, the electronic device 301 may acquire images of the subject 430-1 and the subject 430-2, based on the AI mode under the control of the processor 350.

In another embodiment, referring to 410, the electronic device 301 may identify, under the control of the processor 350, that the subject 410-1 moves out of the range of the angle of view of the camera module 310 so that the subject 410-1 is not included in the external environment. In this case, referring to 420, under the control of the processor 350, the electronic device 301 may acquire the image 420-2 of the external environment on the basis of the stereo mode.

The electronic device 301 may acquire an AI mode-based image by using only the first camera module 311 (or second camera module 312) under the control of the processor 350.

The electronic device 301 may perform image segmentation in the AI mode by using at least one camera module (first camera module 311 or second camera module 312) under the control of the processor 350. For example, referring to 430 and 431, the electronic device 301 may perform image segmentation in the AI mode by identifying the subject 430-1 and the subject 430-2 belonging to the designated subjects, under the control of the processor 350. The electronic device 301 may distinguish (or separate) a subject image 431-1 from a background image 431-2, which corresponds to a background 430-3 excluding the subject, within the acquired image under the control of the processor 350. The electronic device 301 may acquire images (e.g., subject image 431-1 and background image 431-2) separated according to areas under the control of the processor 350.

The electronic device 301 may generate a bokeh image by blurring a part of the image acquired in the stereo mode or AI mode, under the control of the processor 350. For example, the electronic device 301 may generate a bokeh image (e.g., a first bokeh image) by performing blur processing according to distance values acquired in stereo mode, under the control of the processor 350. As a specific example, under the control of the processor 350, the electronic device 301 may apply differential blur intensities and effects (e.g., blur intensities and effects relating to the shape, size, and form of a blob) to the acquired image according to distance values. As another example, under the control of the processor 350, the electronic device 301 may generate a bokeh image (e.g., a second bokeh image) by blurring a part (e.g., background image 431-1) of the separated images (e.g., subject image 431-1 and background image 431-2) acquired in the AI mode.

Under the control of the processor 350, the electronic device 301 may switch (change) a mode (e.g., stereo mode or AI mode) according to whether the subject (e.g., subject 410-1, subject 430-1, or subject 430-2) is identified. For example, the electronic device 301 may periodically identify, under the control of the processor 350, whether a subject corresponding to the designated subjects is included in the angle of view of the camera module (e.g., camera module 180). The electronic device 301 may perform switching to the AI mode under the control of the processor 350, while performing photographing in the stereo mode, in response to identification that the subject corresponding to the designated subjects is included. The electronic device 301 may perform switching to the stereo mode under the control of the processor 350, while performing photographing in the AI mode, in response to identification that the subject corresponding to the designated subjects is not included. The electronic device 301 may minimize current consumption and heat generation by adaptively using the AI mode, which requires high current consumption, only when necessary under the control of the processor 350.

Detailed descriptions of operations according to various embodiments, such as acquiring an image on the basis of the stereo mode, acquiring an image on the basis of the AI mode, and blurring a part of the acquired image under the control of the processor 350, will be described later with reference to FIG. 5 to FIG. 9. If necessary, the detailed descriptions will be provided later with reference to 410, 420, and 430 of FIG. 4.

With reference to FIG. 4, the stereo mode and the AI mode have been described as operations of the electronic device 301, which use the first camera module 311 and/or the second camera module 312. Operations of FIG. 4 according to various embodiments are not limited to the aforementioned operations of the electronic device 301, which use the first camera module 311 and the second camera module 312, and may be implemented with the camera module 310 (or first camera module 311) and the distance detection sensor 320. For example, the operations of acquiring distance values by using the first camera module 311 and the second camera module 312, described with reference to FIG. 4, may also be performed using the distance detection sensor 320. As another example, operations related to the AI mode or stereo mode, which are performed using the first camera module 311, may also be performed using the camera module 310 (or first camera module 311).

Figure 5:
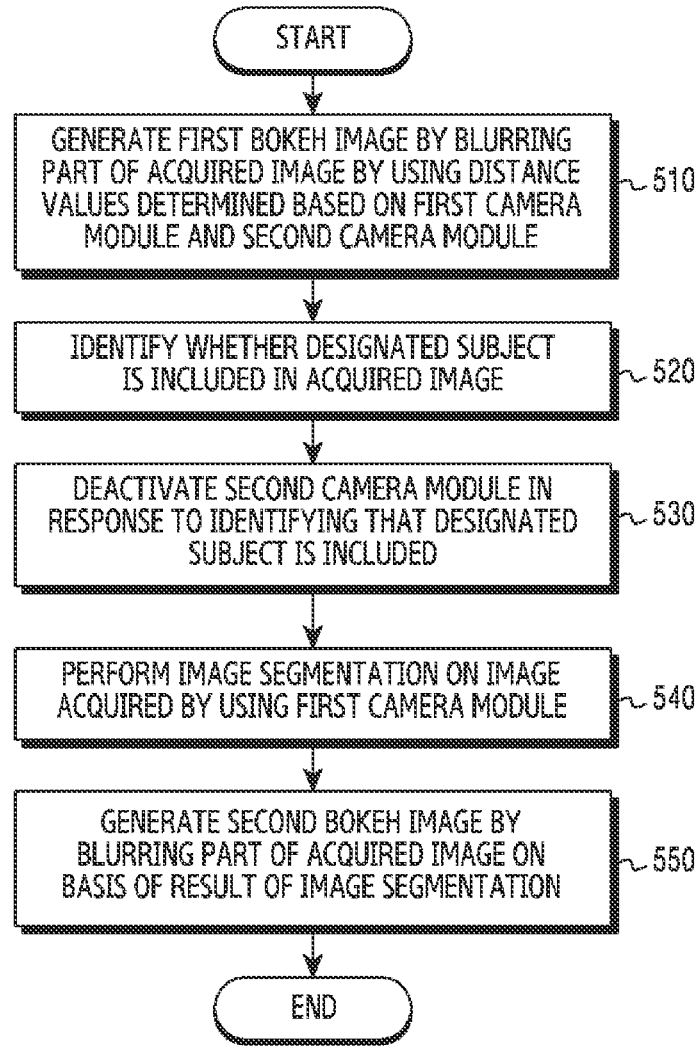
FIG. 5 is a flowchart illustrating generating a bokeh image according to a subject by the electronic device, according to an embodiment.

FIG. 5 illustrates a flow of generating a bokeh image according to a subject by the electronic device, according to an embodiment.

In step 510, the electronic device 301 may generate a first bokeh image by blurring a part of an acquired image by using distance values determined based on the first camera module 311 and the second camera module 312. For example, the electronic device 301 may acquire the distance values included in the acquired image by using the first camera module 311 and the second camera module 312, under the control of the processor 350. The electronic device 301 may blur a part of the acquired image by using the acquired distance values under the control of the processor 350. The electronic device 301 may generate the first bokeh image by blurring a part of the acquired image according to the acquired distance values, under the control of the processor 350.

Detailed descriptions of step 510 according to an embodiment will be provided later with reference to FIG. 6.

In step 520, the electronic device 301 may identify whether a designated subject is included in the acquired image.

Under the control of the processor 350, the electronic device 301 may periodically perform AI-based image segmentation and may identify whether the designated subject is included in the acquired image, based on an image segmentation result. For example, referring to FIG. 4, under the control of the processor 350, the electronic device 301 may periodically make a determination (e.g., at 410) of mode switching according to the AI-based image segmentation, while performing stereo-based image acquisition and generation (e.g., at 420). The electronic device 301 may switch to the AI mode, under the control of the processor 350, when the designated subject (e.g., subject 430-1 or subject 430-2) is included in the acquired image.

In a case of a person among types of subjects supported by the AI mode, the electronic device 301 may use face information as a trigger for subject identification in the AI mode, under the control of the processor 350. After switching to the AI mode and starting image segmentation, the electronic device 301 may identify a person, based on a result of the image segmentation under the control of the processor 350 even when there is no face information, such as a case of a person's back.

Under the control of the processor 350, the electronic device 301 may switch to the stereo mode when a person cannot be identified in a certain number of frames or more in acquired images, and may switch to the AI mode when a person is identifiable again in the acquired images.

The electronic device 301 may apply the aforementioned operations, which are applied to a person, to all types of subjects, such as animals, cars, and food, under the control of the processor 350.

In step 530, under the control of the processor 350, the electronic device 301 may deactivate the second camera module 312 in response to identifying that the designated subject is included.

The electronic device 301 may deactivate a part (e.g., second camera module 312) of multiple camera modules (e.g., first camera module 311 and second camera module 312) under the control of the processor 350. The electronic device 301 may minimize current consumption by deactivating a part of the camera modules.

In step 540, the electronic device 301 may perform image segmentation on the image acquired using the first camera module 311.

When performing image segmentation, the electronic device 301 may use only the first camera module 311 and may operate the AI mode on the basis of NPU and/or learning data (e.g., pre-learned data relating to image segmentation), under the control of the processor 350.

When performing image segmentation according to the AI mode, the electronic device 301 may designate (or define) and learn, in advance, subjects to be identified and may have learning data stored in the memory 330, under the control of the processor 350. The electronic device 301 may estimate, in units of pixels, an area of a subject included in the designated subjects in the acquired image, under the control of the processor 350. The electronic device 301 may separately identify a subject image (or subject image area) and a background image (e.g., background image area) in the acquired image by estimating the area of the subject in units of pixels, under the control of the processor 350.

Under the control of the processor 350, the electronic device 301 may use, in a case of a person, face information as a trigger for subject identification in the AI mode, and after starting image segmentation, the electronic device 301 may identify a person even when there is no face information, such as a case of a person's back, based on a result (or learning data) of the image segmentation.

Types of subjects, for which the AI mode of the electronic device 301 supports image segmentation, may be all types of subjects, such as people, animals, cars, and food.

When the electronic device 301 performs image segmentation under the control of the processor 350, there may be a case in which photographing is performed using photographing assistance equipment such as a tripod. The electronic device 301 may be photographing, in the stereo mode, an object that is not subject to the AI mode, and there may be a case in which a subject (e.g., person) supportable by AI enters the angle of view of the camera module (e.g., first camera module 311). In this case, in a state where the electronic device 301 initially operates in the stereo mode and distance values are thus extracted, image segmentation may be performed only on a person area which corresponds to a corresponding distance value, under the control of the processor 350. By using the distance values having already been extracted in the stereo mode, the electronic device 301 may utilize the distance values of the subject image and background image even in the AI mode, under the control of the processor 350. The electronic device 301 may identify boundary surfaces of subjects more accurately by utilizing the distance values of the stereo mode in the AI mode, and may separately identify the subject image (or subject image area) and the background image (e.g., background image area) in the acquired image, under the control of the processor 350.

In step 550, the electronic device 301 may generate a second bokeh image by blurring a part of the acquired image on the basis of a result of image segmentation.

Under the control of the processor 350, the electronic device 301 may separately identify the subject image (or subject image area) and the background image (e.g., background image area) in the acquired image, and may blur the background image that is a part of the acquired image. For example, the electronic device 301 may blur the background image with an identical blur intensity and may blur the background image with different blur intensities according to the distance values under the control of the processor 350. The electronic device 301 may blur the background image by differently configuring the shape and size of a blob relating to blur processing according to the distance values under the control of the processor 350.

As another example, the electronic device 301 may perform blurring by differently configuring the blur intensity to be applied to the background image according to the size of the subject image under the control of the processor 350. The electronic device 301 may blur the background image by differently configuring the shape and size of a blob relating to blur processing according to the size of the subject image under the control of the processor 350.

More detailed descriptions of steps 510 to 550 described with reference to FIG. 5 will be provided later with reference to FIG. 6 to FIG. 9.

In various embodiments described with reference to FIG. 5, the stereo mode and the AI mode have been described as operations of the electronic device 301, which use the first camera module 311 and/or the second camera module 312. Operations of FIG. 5 according to various embodiments are not limited to the aforementioned operations of the electronic device 301, which use the first camera module 311 and the second camera module 312, and may be implemented with the camera module 310 (or first camera module 311) and the distance detection sensor 320. For example, operations of acquiring a distance value by using the first camera module 311 and the second camera module 312, described with reference to FIG. 5, may also be performed using the distance detection sensor 320. As another example, operations related to the AI mode or stereo mode, which are performed using the first camera module 311, may also be performed using the camera module 310 (or first camera module 311).

Figure 6:
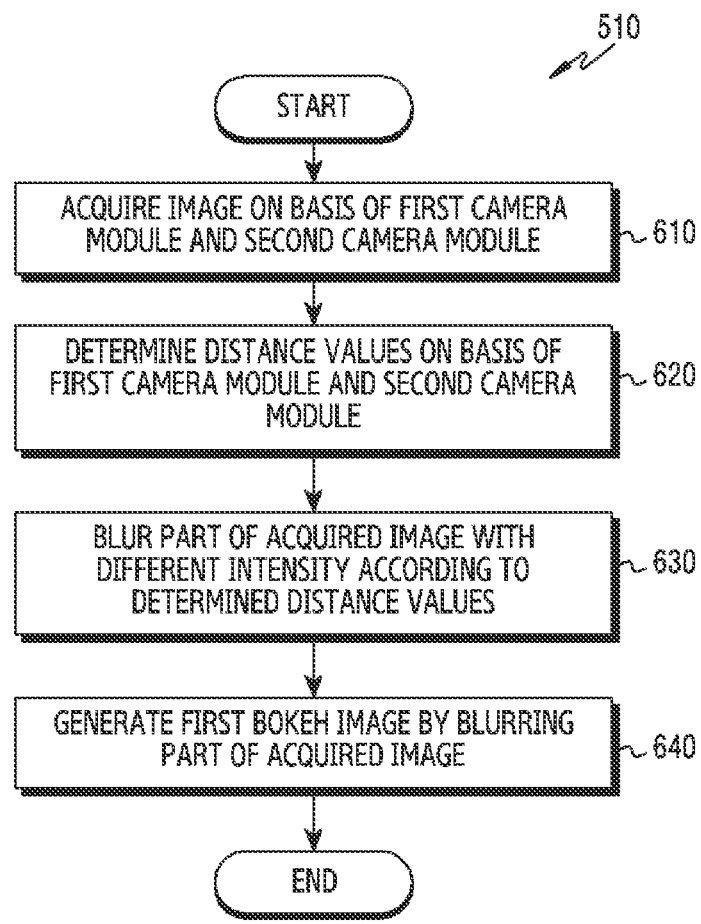
FIG. 6 is a flowchart illustrating generating a bokeh image on the basis of a stereo mode by the electronic device, according to an embodiment.

FIG. 6 illustrates generating a bokeh image on the basis of the stereo mode by the electronic device according to an embodiment.

Steps 610 to 640 according to an embodiment may correspond to step 510 of FIG. 5, and the descriptions of step 510 may apply.

In step 610, the electronic device 301 may acquire an image, based on the first camera module 311 and the second camera module 312.

The electronic device 301 may acquire images of the external environment by using the first camera module 311 and the second camera module 312 under the control of the processor 350.

When photographing is performed in the stereo mode using the first camera module 311 and the second camera module 312, the electronic device 301 may perform synchronization so that a camera setting of the first camera module 311 is applied to the second camera module 312 in the same way, under the control of the processor 350. For example, if the camera setting of the first camera module 311 is different from a camera setting of the second camera module 312, the processor 350 of the electronic device 301 may perform control so that the camera setting of the second camera module 312 becomes identical to the camera setting of the first camera module 311. The electronic device 301 may perform the aforementioned synchronization and may acquire and generate a stable image by applying the synchronized camera setting, under the control of the processor 350. The electronic device 301 may solve an accuracy problem occurring in acquisition of distance values due to differential application of camera settings, by performing synchronization of the camera settings under the control of the processor 350. The aforementioned camera settings may include at least settings related to OIS, AF, AE, and AWB. The electronic device 301 may acquire an image in the stereo mode by using the first camera module 311 and the second camera module 312, for which camera settings have been synchronized, under the control of the processor 350.

In step 620, the electronic device 301 may determine distance values, based on the first camera module 311 and the second camera module 312.

Under the control of the processor 350, the electronic device 301 may determine (or estimate) distance values of all pixels in the acquired image by using the first camera module 311 and the second camera module 312. For example, the electronic device 301 may determine, as pixels included in a subject image, pixels having a similar distance value to that of a pixel corresponding to a focal point, under the control of the processor 350. As another example, the electronic device 301 may determine, as pixels included in a background image, pixels which do not have a similar distance value to that of the pixel corresponding to the focal point, under the control of the processor 350.

The electronic device 301 may blur, in step 630, a part of the acquired image with a different blur intensity (and/or blur effect) according to the determined distance value, and the electronic device 301 may generate, in step 640, a first bokeh image by blurring the part of the acquired image.

Under the control of the processor 350, the electronic device 301 may determine, as pixels included in the subject image, pixels having a similar distance value to that of the pixel corresponding to the focal point, thereby keeping the pixels having the similar distance in focus. As another example, under the control of the processor 350, the electronic device 301 may determine, as pixels included in the background image, pixels having a different distance value from that of the pixel corresponding to the focal point, and may apply a bokeh effect by blurring the pixels having the different distance value.

The electronic device 301 may perform blurring with different blur intensities according to the distance values of pixels under the control of the processor 350. For example, the electronic device 301 may apply a strong blur to pixels having a large distance value and may apply a weak blur to pixels having a small distance value under the control of the processor 350.

Under the control of the processor 350, the electronic device 301 may blur the background image with different blur intensities according to the distance values, and may blur the background image by differently configuring the shapes and sizes of blobs relating to blur processing according to the distance values. For example, the electronic device 301 may apply a large blob to pixels having a large distance value and may apply a small blob to pixels having a small distance value under the control of the processor 350.

The electronic device 301 may generate the first bokeh image by blurring a part of the acquired image, under the control of the processor 350.

In various embodiments described with reference to FIG. 6, the stereo mode and the AI mode have been described as operations of the electronic device 301, which use the first camera module 311 and/or the second camera module 312. Operations of FIG. 6 according to various embodiments are not limited to the aforementioned operations of the electronic device 301, which use the first camera module 311 and the second camera module 312, and may be implemented with the camera module 310 (or first camera module 311) and the distance detection sensor 320. For example, the operations of acquiring distance values by using the first camera module 311 and the second camera module 312, described with reference to FIG. 6, may also be performed using the distance detection sensor 320. As another example, operations related to the AI mode or stereo mode, which are performed using the first camera module 311, may also be performed using the camera module 310 (or first camera module 311).

Figure 7:
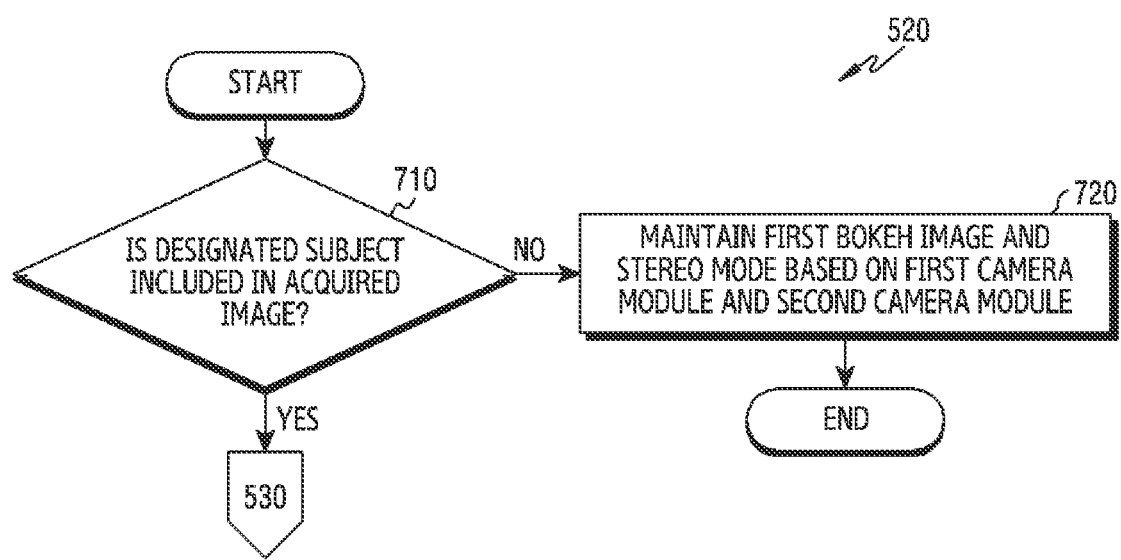
FIG. 7 is a flowchart illustrating a part of a switching process between a stereo mode and an AI mode by the electronic device, according to an embodiment.

FIG. 7 illustrates a part of a switching process between the stereo mode and the AI mode by the electronic device, according to an embodiment.

In step 710, the electronic device 301 may identify whether the designated subject is included in the acquired image.

The electronic device 301 may periodically identify whether the designated subject is included in the acquired image under the control of the processor 350. For example, the electronic device 301 may periodically determine whether to switch to the AI mode, by performing image segmentation of the AI mode under the control of the processor 350 even while operating based on the stereo mode. As another example, under the control of the processor 350, the electronic device 301 may periodically identify whether it is possible to switch the stereo mode to the AI mode or to switch the AI mode to the stereo mode, by performing AI mode-based image segmentation in the acquired image at regular time intervals.

Under the control of the processor 350, the electronic device 301 may perform step 530 when the designated subject is identified to be included in the acquired image, and may perform step 720 when no designated subject is identified to be included in the acquired image.

When the designated subject is identified to be included in the acquired image, the electronic device 301 may operate in the AI mode and perform step 530 of deactivating a part (e.g., second camera module 312) of the camera modules, under the control of the processor 350.

Even after switching from the AI mode to the stereo mode, the electronic device 301 may switch back to the AI mode when the designated subject is identified, under the control of the processor 350.

When no designated subject is identified in a certain number of frames or more within the acquired image, the electronic device 301 may perform step 720 of maintaining the first bokeh image and the stereo mode based on the first camera module 311 and the second camera module 312, under the control of the processor 350.

Under the control of the processor 350, the electronic device 301 may prevent an error occurring due to repeated switching (or change) between the stereo mode and the AI mode and may perform operations described below for system stability.

Since the electronic device 301 is fundamentally in a state where it is not determined whether the designated subject is identified, the electronic device 301 may request activation/deactivation of the multiple camera modules (e.g., first camera module 311 and second camera module 312) under the control of the processor 350. The processor 350 may continue the request until the cameras are controllable. When the processor 350 continues the request for a predetermined time (e.g., 1 second), the multiple camera modules (e.g., first camera module 311 and second camera module 312) may become controllable. When the cameras are controllable, the processor 350 may control activation/deactivation of the multiple cameras. For example, when a request for activating two camera modules is acquired, the processor 350 of the electronic device 301 may activate the first camera module 311 and the second camera module 312. As another example, when a request for deactivating one camera module is acquired, the processor 350 of the electronic device 301 may deactivate the second camera module 312.

The electronic device 301 may switch to the AI mode when the presence of the designated subject in the acquired image is identified, under the control of the processor 350. In this case, the processor 350 of the electronic device 301 may transmit a request for deactivating one camera module (e.g., second camera module 312) to the multiple camera modules (e.g., first camera module 311 and second camera module 312). The processor 350 may continue the request until the cameras are controllable. When the processor 350 continues the request for a predetermined time (e.g., 1 second), the multiple camera modules may become controllable. When the cameras are controllable, the processor 350 may control deactivation of one camera module (e.g., second camera module 312). The processor 350 may deactivate the second camera module 312 in response to the deactivation request.

The electronic device 301 may switch to the stereo mode when the absence of the designated subject in the acquired image is identified, under the control of the processor 350. In this case, the processor 350 of the electronic device 301 may transmit a request for activating one camera module (e.g., second camera module 312) to the multiple camera modules (e.g., first camera module 311 and second camera module 312). The processor 350 may continue the request until the cameras are controllable. When the processor 350 continues the request for a predetermined time (e.g., 1 second), the multiple camera modules may become controllable. When the cameras are controllable, the processor 350 may control activation of one camera module (e.g., second camera module 312). The processor 350 may activate the second camera module 312 in response to the activation request.

In various embodiments described with reference to FIG. 7, the stereo mode and the AI mode have been described as operations of the electronic device 301, which use the first camera module 311 and/or the second camera module 312. Operations of FIG. 7 according to various embodiments are not limited to the aforementioned operations of the electronic device 301, which use the first camera module 311 and the second camera module 312, and may be implemented with the camera module 310 (or first camera module 311) and the distance detection sensor 320. For example, operations of acquiring a distance value by using the first camera module 311 and the second camera module 312, described with reference to FIG. 7, may also be performed using the distance detection sensor 320. As another example, operations related to the AI mode or stereo mode, which are performed using the first camera module 311, may also be performed using the camera module 310 (or first camera module 311).

Figure 8:
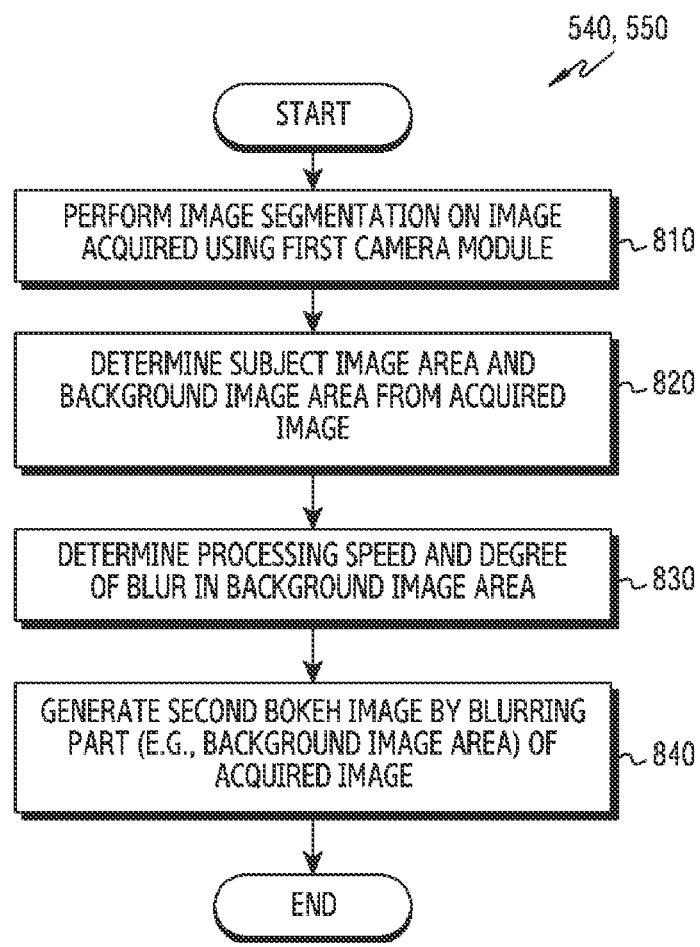
FIG. 8 is a flowchart illustrating generating a bokeh image on the basis of an AI mode by the electronic device, according to an embodiment.

FIG. 8 illustrates generating a bokeh image on the basis of the AI mode by the electronic device, according to an embodiment.

The electronic device 301 may perform, in step 810, image segmentation on the image acquired using the first camera module 311, and may determine, in step 820, a subject image area and a background image area from the acquired image.

When performing image segmentation, the electronic device 301 may use only the first camera module 311 and may operate the AI mode on the basis of NPU and/or learning data, under the control of the processor 350. When performing image segmentation according to the AI mode, the electronic device 301 may designate (or define) and learn, in advance, subjects to be identified and may generate and store learning data, under the control of the processor 350. The electronic device 301 may estimate, in units of pixels, an area of a subject included in the designated subjects in the acquired image, under the control of the processor 350. The electronic device 301 may separately identify a subject image (or subject image area) and a background image (e.g., background image area) in the acquired image by estimating the area of the subject in units of pixels, under the control of the processor 350. Under the control of the processor 350, the electronic device 301 may use, in a case of a person, face information as a trigger for subject identification in the AI mode, and after starting image segmentation, the electronic device 301 may identify a person even when there is no face information, such as a case of a person's back, based on a result of the image segmentation. Types of subjects, for which the AI mode of the electronic device 301 supports image segmentation, may be all types of subjects, such as animals, cars, and food as well as people.

In step 830, the electronic device 301 may determine a processing speed and a degree of blur (e.g., blur intensity) in the background image.

Under the control of the processor 350, the electronic device 301 may separate the subject image/background image from the acquired image and may apply an identical blur intensity to the background image. In order to determine a blur intensity, the electronic device 301 may initially extract distance values based on the stereo mode under the control of the processor 350 even in a case of the designated subject that is subject to the AI mode. The electronic device 301 may estimate the distance values in the acquired image, thereby determining the blur intensity corresponding to the distance values, under the control of the processor 350. After determining the blur intensity, the electronic device 301 may adjust the blur intensity according to an area size of the subject image in the AI mode under the control of the processor 350.

When generating a second bokeh image in the AI mode from the first bokeh image generated in the stereo mode, the electronic device 301 may determine a blur processing speed (e.g., switching speed) for natural image transformation, under the control of the processor 350. For example, when blurring the background image excluding the subject image in the AI mode, the electronic device 301 may blur the background image with an identical blur intensity under the control of the processor 350. The electronic device 301 may apply a strong blur to pixels having a large distance value and may apply a weak blur to pixels having a small distance value from among pixels in the acquired image, under the control of the processor 350. In this case, for the background image excluding the subject image, the electronic device 301 may use a largest distance value or a smallest distance value among the distance values acquired in the stereo mode, and when switching is performed, the electronic device 301 may enable switching at a different speed according to the blur intensity. As a specific example, it is assumed that a blur intensity corresponding to the largest distance value among the distance values acquired by the electronic device 301 is 80, and a blur intensity corresponding to the smallest distance value is 20. It may be assumed that distance values corresponding to blur intensities of 40 and 60 also exist in the image acquired by the electronic device 301. In this case, when it is identified that the designated subject is present in the angle of view of the camera module (e.g., first camera module 311 or second camera module 312) of the electronic device 301, switching may be performed to the AI mode under the control of the processor 350. When switching is performed to the AI mode, the electronic device 301 may apply an identical blur intensity (e.g., 90) to the background image under the control of the processor 350. When applying the blur intensity of 80 to the background image, the electronic device 301 may determine a processing speed (e.g., first processing speed) so that an area with a blur intensity of 20 may be changed to have the blur intensity of 80 at a fast speed, may determine a processing speed (e.g., second processing speed) so that an area with a blur intensity of 40 may be changed to have the blur intensity of 80 at an intermediate speed, and may determine a processing speed (e.g., third processing speed) so that an area with a blur intensity of 60 may be changed to have the blur intensity of 80 at a slow speed.

In step 840, the electronic device 301 may generate a second bokeh image by blurring a part (e.g., background image area) of the acquired image.

The electronic device 301 may control the image to be switched naturally by applying different processing speeds to the first bokeh image according to the distance values, based on the control of the processor 350. For example, when applying the blur intensity of 80 to the background image, the electronic device 301 may perform control based on the processor 250 so that the area with the blur intensity of 20 may be changed to have the blur intensity of 80 at a fast speed (e.g., first processing speed), the area with the blur intensity of 40 may be changed to have the blur intensity of 80 at an intermediate speed (e.g., second processing speed), and the area with the blur intensity of 60 may be changed to have the blur intensity of 80 at a slow speed (e.g., third processing speed). The electronic device 301 may generate the second bokeh image by blurring a part (e.g., background image area) of the acquired image on the basis of the determined blur intensity and processing speed.

In various embodiments described with reference to FIG. 8, the stereo mode and the AI mode have been described as operations of the electronic device 301, which use the first camera module 311 and/or the second camera module 312. Operations of FIG. 8 according to various embodiments are not limited to the aforementioned operations of the electronic device 301, which use the first camera module 311 and the second camera module 312, and may be implemented with the camera module 310 (or first camera module 311) and the distance detection sensor 320. For example, operations of acquiring a distance value by using the first camera module 311 and the second camera module 312, described with reference to FIG. 8, may also be performed using the distance detection sensor 320. As another example, operations related to the AI mode or stereo mode, which are performed using the first camera module 311, may also be performed using the camera module 310 (or first camera module 311).

Figure 9:
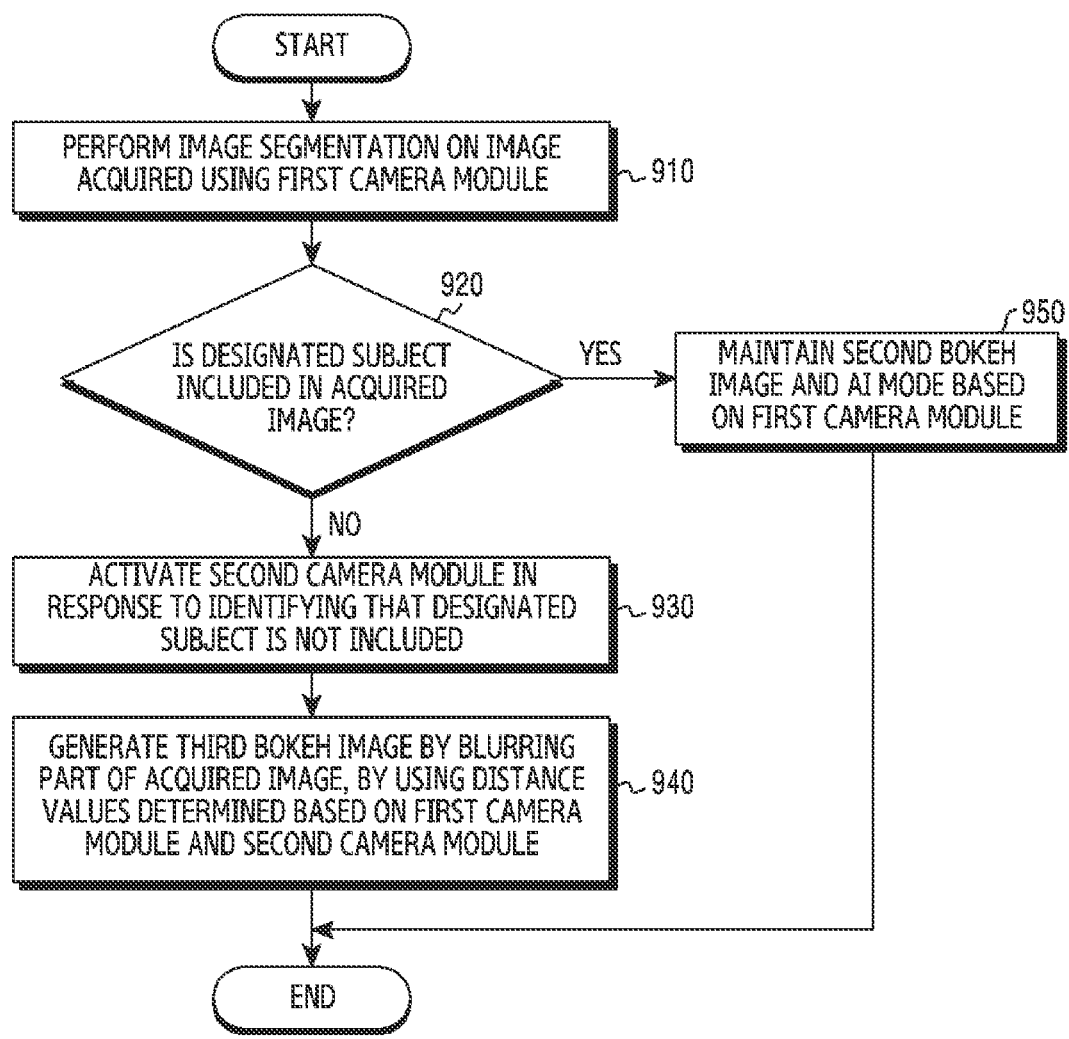
FIG. 9 is a flowchart illustrating a switching a mode according to a subject, and generating a bokeh image on the basis of the switched mode by the electronic device, according to an embodiment.

FIG. 9 illustrates switching a mode according to a subject, and generating a bokeh image on the basis of the switched mode by an electronic device, according to an embodiment.

There may be a case in which photographing is performed using photographing assistance equipment such as a tripod. The electronic device 301 may be photographing a subject (e.g., person) that is supported by the AI mode, and there may be a case in which a subject (e.g., person) supportable by AI deviates from the angle of view of the camera module (e.g., first camera module 311).

In step 910, the electronic device 301 may perform image segmentation on an image acquired using the first camera module 311. When performing image segmentation, the electronic device 301 may use only the first camera module 311 and may operate the AI mode on the basis of NPU and/or learning data (e.g., learned data relating to image segmentation), under the control of the processor 350. The electronic device 301 may estimate, in units of pixels, an area of a subject (e.g., person) included in designated subjects in the acquired image, under the control of the processor 350. The electronic device 301 may separately identify a subject image (or subject image area) and a background image (e.g., background image area) in the acquired image by estimating the area of the subject (e.g., person) in units of pixels, under the control of the processor 350.

In step 920, the electronic device 301 may identify whether the designated subject is included in the acquired image.

The electronic device 301 may perform step 930 when no designated subject (e.g., person) is identified to be included in the acquired image in step 920, and may perform step 950 when the designated subject is identified to be included in the acquired image in step 920.

In step 950, the electronic device 301 may maintain the second bokeh image and the AI mode based on the first camera module 311. For example, the electronic device 301 may be photographing a subject (e.g., person) that is supported by the AI mode. When an AI-supportable subject (e.g., person) does not deviate from the angle of view of the camera module (e.g., first camera module 311), the electronic device 301 may maintain the existing AI mode and a generated second bokeh image under the control of the processor 350.

In step 930, the electronic device 301 may activate the second camera module 312 in response to identifying that the designated subject is not included in step 920. For example, when an AI-supportable subject (e.g., person) deviates from the angle of view of the camera module (e.g., first camera module 311), the electronic device 301 may activate the second camera module 312 to switch to the stereo mode, under the control of the processor 350.

In step 940, the electronic device 301 may generate a third bokeh image by blurring a part of the acquired image by using the distance values determined based on the first camera module 311 and the second camera module 312. For example, the electronic device 301 may acquire the distance values of subjects included in the acquired image by using the first camera module 311 and the second camera module 312 under the control of the processor 350. The electronic device 301 may blur a part of the acquired image by using the acquired distance values under the control of the processor 350. The electronic device 301 may generate the third bokeh image by blurring a part of the acquired image according to the acquired distance values, under the control of the processor 350.

In various embodiments described with reference to FIG. 9, the stereo mode and the AI mode have been described as operations of the electronic device 301, which use the first camera module 311 and/or the second camera module 312. Operations of FIG. 9 according to various embodiments are not limited to the aforementioned operations of the electronic device 301, which use the first camera module 311 and the second camera module 312, and may be implemented with the camera module 310 (or first camera module 311) and the distance detection sensor 320. For example, the operations of acquiring distance values by using the first camera module 311 and the second camera module 312, described with reference to FIG. 9, may also be performed using the distance detection sensor 320. As another example, operations related to the AI mode or stereo mode, which are performed using the first camera module 311, may also be performed using the camera module 310 (or first camera module 311).

In an electronic device (e.g., electronic device 301) according to an embodiment of the disclosure, the electronic device (e.g., electronic device 301) may include: a first camera module (e.g., first camera module 311) and a second camera module (e.g., second camera module 312); a memory (e.g., memory 330); and a processor (e.g., processor 350) operatively connected to the first camera module (e.g., first camera module 311), the second camera module (e.g., second camera module 312), and the memory (e.g., memory 330), wherein: the processor (e.g., processor 350) generates a first bokeh image by blurring a part of an image acquired using at least one of the first camera module (e.g., first camera module 311) or the second camera module (e.g., second camera module 312), by using distance values determined based on the first camera module (e.g., first camera module 311) and the second camera module (e.g., second camera module 312), and identifies whether a designated subject is included in the acquired image by using at least one of the first camera module (e.g., first camera module 311) or the second camera module (e.g., second camera module 312); and in response to identifying that the designated subject is included, the processor (e.g., processor 350) deactivates the second camera module (e.g., second camera module 312), performs image segmentation on the acquired image by using the first camera module (e.g., first camera module 311), and generates a second bokeh image by blurring a part of the acquired image, based on a result of the image segmentation.

In the electronic device (e.g., electronic device 301) according to an embodiment of the disclosure, the designated subject may be a subject that has been learned or designated in advance on the basis of AI.

In the electronic device (e.g., electronic device 301) according to an embodiment of the disclosure, the processor (e.g., processor 350) may determine, when generating the first bokeh image, a second camera setting of the second camera module (e.g., second camera module 312), based on a first camera setting of the first camera module (e.g., first camera module 311).

In the electronic device (e.g., electronic device 301) according to an embodiment of the disclosure, the first camera setting and the second camera setting may be at least one of settings relating to optical image stabilizer (OIS), auto-focusing (AF), auto-exposure (AE), and auto white balance (AWB).

In the electronic device (e.g., electronic device 301) according to an embodiment of the disclosure, the processor (e.g., processor 350) may apply, when generating the first bokeh image, a different blur intensity to each area of the acquired image according to the distance values.

In the electronic device (e.g., electronic device 301) according to an embodiment of the disclosure, the electronic device (e.g., electronic device 301) may further include a display (e.g., display 340), wherein the processor (e.g., processor 350): switches, while displaying the first bokeh image on the display (e.g., display 340), the first bokeh image displayed on the display (e.g., display 340) to the second bokeh image generated in response to identifying that the designated subject is included; and when switching the first bokeh image to the second bokeh image, applies a different processing speed depending on a blur degree (blur intensity) according to the distance values.

In the electronic device (e.g., electronic device 301) according to an embodiment of the disclosure, the processor (e.g., processor 350) may use, when generating the second bokeh image, the distance values used to generate the first bokeh image.

In the electronic device (e.g., electronic device 301) according to an embodiment of the disclosure, the processor (e.g., processor 350) may periodically perform the identifying of whether the designated subject is included in the acquired image.

In the electronic device (e.g., electronic device 301) according to an embodiment of the disclosure, the processor (e.g., processor 350) may identify, after the second bokeh image is generated, whether the designated subject is included in the acquired image, and in response to identifying that the designated subject is not included, the processor may activate the second camera module (e.g., second camera module 312), and may generate a third bokeh image by blurring a part of the acquired image by using the distance values determined based on the first camera module (e.g., first camera module 311) and the second camera module (e.g., second camera module 312).

An operation method of an electronic device (e.g., electronic device 301) according to an embodiment of the disclosure may include; generating a first bokeh image by blurring a part of an image acquired using at least one of a first camera module (e.g., first camera module 311) or a second camera module (e.g., second camera module 312), by using distance values determined based on the first camera module (e.g., first camera module 311) and the second camera module (e.g., second camera module 312), and identifying whether a designated subject is included in the acquired image by using at least one of the first camera module (e.g., first camera module 311) or the second camera module (e.g., second camera module 312); and in response to identifying that the designated subject is included, deactivating the second camera module (e.g., second camera module 312), performing image segmentation on the acquired image by using the first camera module (e.g., first camera module 311), and generating a second bokeh image by blurring a part of the acquired image, based on a result of the image segmentation.

In the operation method of the electronic device (e.g., electronic device 301) according to an embodiment of the disclosure, the designated subject may be a subject that has been learned or designated in advance.

In the operation method of the electronic device (e.g., electronic device 301) according to an embodiment of the disclosure, the generating of the first bokeh image may further include determining a second camera setting of the second camera module (e.g., second camera module 312), based on a first camera setting of the first camera module (e.g., first camera module 311).

In the operation method of the electronic device (e.g., electronic device 301) according to an embodiment of the disclosure, the first camera setting and the second camera setting may be at least one of settings relating to optical image stabilizer (OIS), auto-focusing (AF), auto-exposure (AE), and auto white balance (AWB).

In the operation method of the electronic device (e.g., electronic device 301) according to an embodiment of the disclosure, the generating of the first bokeh image may further include applying a different blur intensity to each area of the acquired image according to the distance values.

The operation method of the electronic device (e.g., electronic device 301) according to an embodiment of the disclosure may further include, displaying the first bokeh image on a display (e.g., display 340); and while the first bokeh image is being displayed on the display (e.g., display 340), switching the first bokeh image displayed on the display (e.g., display 340) to the second bokeh image generated in response to identifying that the designated subject is included, wherein the switching of the first bokeh image to the second bokeh image includes applying a different processing speed depending on a blur degree (blur intensity) according to the distance values.

In the operation method of the electronic device (e.g., electronic device 301) according to an embodiment of the disclosure, the generating of the second bokeh image may further include using the distance values used to generate the first bokeh image.

In the operation method of the electronic device (e.g., electronic device 301) according to an embodiment of the disclosure, the identifying of whether the designated subject is included in the acquired image may be performed periodically.

The operation method of the electronic device (e.g., electronic device 301) according to an embodiment of the disclosure may include: after the second bokeh image is generated, identifying whether the designated subject is included in the acquired image; and in response to identifying that the designated subject is not included, activating the second camera module (e.g., second camera module 312), and generating a third bokeh image by blurring a part of the acquired image by using the distance values determined based on the first camera module (e.g., first camera module 311) and the second camera module (e.g., second camera module 312).

In an electronic device (e.g., electronic device 301) according to an embodiment of the disclosure, the electronic device (e.g., electronic device 301) may include: a camera module (e.g., camera module 310) and a distance detection sensor (e.g., distance detection sensor 320); a memory (e.g., memory 330); and a processor (e.g., processor 350) operatively connected to the camera module (e.g., camera module 310), the distance detection sensor (e.g., distance detection sensor 320), and the memory (e.g., memory 330), wherein: the processor (e.g., processor 350) generates a first bokeh image by blurring a part of an image acquired using the camera module (e.g., camera module 310), by using distance values determined based on the distance detection sensor (e.g., distance detection sensor 320), and identifies whether a designated subject is included in the acquired image by using the camera module (e.g., camera module 310), and in response to identifying that the designated subject is included, the processor (e.g., processor 350) deactivates the distance detection sensor (e.g., distance detection sensor 320), performs image segmentation on the acquired image by using the camera module (e.g., camera module 310), and generates a second bokeh image by blurring a part of the acquired image, based on a result of the image segmentation.

In the electronic device (e.g., electronic device 301) according to an embodiment of the disclosure, the processor (e.g., processor 350) may identify, after the second bokeh image is generated, whether the designated subject is included in the acquired image, and in response to identifying that the designated subject is not included, the processor (e.g., processor 350) may activate the distance detection sensor (e.g., distance detection sensor 320), and may generate a third bokeh image by blurring a part of the acquired image by using the distance values determined based on the distance detection sensor (e.g., distance detection sensor 320).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A. B. and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a first camera module and a second camera module;
   a memory; and
   a processor operatively connected to the first camera module, the second camera module, and the memory, wherein the processor is configured to:
   generate a first bokeh image by blurring a part of an image acquired using at least one of the first camera module or the second camera module, by using distance values determined based on the first camera module and the second camera module;
   identify whether a designated subject is included in the acquired image by using at least one of the first camera module or the second camera module; and
   in response to identifying that the designated subject is included, deactivate the second camera module, perform image segmentation on the acquired image by using the first camera module, and generate a second bokeh image by blurring a part of the acquired image, based on a result of the image segmentation.

2. The electronic device of claim 1, wherein the designated subject is a subject that has been learned or designated in advance on the basis of artificial intelligence (AI).

3. The electronic device of claim 1, wherein the processor is further configured to, when generating the first bokeh image, determine a second camera setting of the second camera module, based on a first camera setting of the first camera module.

4. The electronic device of claim 3, wherein the first camera setting and the second camera setting are at least one of settings relating to optical image stabilizer (MS), auto-focusing (AF), auto-exposure (AE), and auto white balance (AWB).

5. The electronic device of claim 1, wherein the processor is further configured to, when generating the first bokeh image, apply a different blur intensity to each area of the acquired image according to the distance values.

6. The electronic device of claim 1, further comprising a display, wherein the processor is further configured to:
   switch, while displaying the first bokeh image on the display, the first bokeh image to the second bokeh image generated in response to identifying that the designated subject is included, and
   when switching the first bokeh image to the second bokeh image, apply a different processing speed depending on a blur intensity according to the distance values.

7. The electronic device of claim 1, wherein the processor is further configured to, when generating the second bokeh image, use the distance values used to generate the first bokeh image.

8. The electronic device of claim 1, wherein the processor is further configured to periodically identify whether the designated subject is included in the acquired image.

9. The electronic device of claim 1, wherein the processor is further configured to:
after generating the second bokeh image, identify whether the designated subject is included in the acquired image; and
in response to identifying that the designated subject is not included, activate the second camera module, and generate a third bokeh image by blurring a part of the acquired image by using the distance values determined based on the first camera module and the second camera module.

10. An operation method of an electronic device, the method comprising:
generating a first bokeh image by blurring a part of an image acquired using at least one of a first camera module or a second camera module, by using distance values determined based on the first camera module and the second camera module;
identifying whether a designated subject is included in the acquired image by using at least one of the first camera module or the second camera module; and
in response to identifying that the designated subject is included, deactivating the second camera module, performing image segmentation on the acquired image by using the first camera module, and generating a second bokeh image by blurring a part of the acquired image, based on a result of the image segmentation.

11. The method of claim 10, wherein the designated subject is a subject that has been learned or designated in advance.

12. The method of claim 10, wherein generating the first bokeh image further comprises determining a second camera setting of the second camera module, based on a first camera setting of the first camera module.

13. The method of claim 12, wherein the first camera setting and the second camera setting are at least one of settings relating to optical image stabilizer (OIS); auto-focusing (AF), auto-exposure (AE), and auto white balance (AWB).

14. An electronic device comprising:
a camera module and a distance detection sensor;
a memory; and
a processor operatively connected to the camera module, the distance detection sensor, and the memory, wherein the processor is configured to:
generate a first bokeh image by blurring a part of an image acquired using the camera module, by using distance values determined based on the distance detection sensor;
identify whether a designated subject is included in the acquired image by using the camera module; and
in response to identifying that the designated subject is included, deactivate the distance detection sensor, perform image segmentation on the acquired image by using the camera module, and generate a second bokeh image by blurring a part of the acquired image, based on a result of the image segmentation.

15. The electronic device of claim 14, wherein the processor is further configured to:
after generating the second bokeh image, identify whether the designated subject is included in the acquired image; and
in response to identifying that the designated subject is not included, activate the distance detection sensor, and generate a third bokeh image by blurring a part of the acquired image by using the distance values determined based on the distance detection sensor.

16. The method of claim 10, wherein generating the first bokeh image further comprises applying a different blur intensity to each area of the acquired image according to the distance values.

17. The method of claim 10, further comprising:
displaying the first bokeh image on a display; and
while the first bokeh image is being displayed on the display, switching the first bokeh image to the second bokeh image generated in response to identifying that the designated subject is included, wherein switching the first bokeh image to the second bokeh image comprises applying a different processing speed depending on a blur intensity according to the distance values.

18. The method of claim 10, wherein generating the second bokeh image further comprises using the distance values used to generate the first bokeh image.

19. The method of claim 10, wherein identifying whether the designated subject is included in the acquired image is performed periodically.

20. The method of claim 10, further comprising:
after the second bokeh image is generated, identifying whether the designated subject is included in the acquired image; and
in response to identifying that the designated subject is not included, activating the second camera module, and generating a third bokeh image by blurring a part of the acquired image by using the distance values determined based on the first camera module and the second camera module.

* * * * *